(12) United States Patent
Jeong et al.

(10) Patent No.: US 8,852,827 B2
(45) Date of Patent: Oct. 7, 2014

(54) METAL SEPARATOR PLATE FOR A FUEL CELL HAVING A COATING LAYER COMPRISING CARBON PARTICLES DISPERSED IN A BINDER RESIN, AND A PRODUCTION METHOD THEREFOR

(75) Inventors: Yeon Soo Jeong, Gyeonggi-do (KR); Yoo Taek Jeon, Gyeonggi-do (KR); Jun Ho Lee, Gyeonggi-do (KR); Jong Chan Park, Gyeonggi-do (KR)

(73) Assignee: Hyundai Hysco, Ulsan (KR)

( * ) Notice: Subject to any disclaimer, the term of this patent is extended or adjusted under 35 U.S.C. 154(b) by 930 days.

(21) Appl. No.: 12/810,342

(22) PCT Filed: Jan. 21, 2009

(86) PCT No.: PCT/KR2009/000314
§ 371 (c)(1),
(2), (4) Date: Jun. 24, 2010

(87) PCT Pub. No.: WO2009/093843
PCT Pub. Date: Jul. 30, 2009

(65) Prior Publication Data
US 2010/0279209 A1  Nov. 4, 2010

(30) Foreign Application Priority Data

Jan. 21, 2008 (KR) .................. 10-2008-0006123

(51) Int. Cl.
*H01M 4/64* (2006.01)
*H01M 8/02* (2006.01)
*H01M 8/10* (2006.01)

(52) U.S. Cl.
CPC .......... *H01M 8/0206* (2013.01); *H01M 8/0221* (2013.01); *H01M 8/021* (2013.01); *H01M 8/0228* (2013.01); *H01M 8/0213* (2013.01); *H01M 2008/1095* (2013.01); *H01M 8/0226* (2013.01); *Y02E 60/50* (2013.01)
USPC ........................................... 429/518; 427/115

(58) Field of Classification Search
USPC .................... 429/418, 518; 427/115; 29/623.1
See application file for complete search history.

(56) References Cited

U.S. PATENT DOCUMENTS 6,440,598 B1  8/2002  Fukui et al.
6,749,959 B2  6/2004  Nakata et al.
(Continued)

FOREIGN PATENT DOCUMENTS

| CN | 1711657 | 12/2005 |
|---|---|---|
| CN | 1754277 | 3/2006 |
| CN | 1833331 | 9/2006 |

(Continued)

*Primary Examiner* — Mark F Huff
*Assistant Examiner* — Monique Wills
(74) *Attorney, Agent, or Firm* — Lowe Hauptman & Ham, LLP (57) ABSTRACT

Disclosed herein is a method of manufacturing a metallic bipolar plate for fuel cells, which can maintain good corrosion resistance and contact resistance without any side effect not only initially but also after a predetermined period of time even in an environment of severe vibration as in vehicles while allowing a continuous process to provide high productivity. The method includes (a) preparing a metal plate as a matrix of the metallic bipolar plate; (b) pickling a surface of the metal plate; (c) coating a composition comprising a binder resin, carbon particles, and a solvent on the pickled surface of the metal plate; and (d) drying the surface of the metal plate, on which the composition is coated, at a temperature less than a thermal decomposition temperature of the binder resin and greater than or equal to a boiling point of the solvent to form a coating layer on the surface of the metal plate, the coating layer having the carbon particles dispersed in a matrix of the binder resin, wherein these processes are performed as a continuous process.

27 Claims, 5 Drawing Sheets

(56) References Cited

U.S. PATENT DOCUMENTS

| | | | |
|---|---|---|---|
| 7,005,205 B1 | 2/2006 | Gyoten et al. | |
| 2002/0037457 A1* | 3/2002 | Choi | 429/231.95 |
| 2004/0091768 A1 | 5/2004 | Abd et al. | |
| 2004/0121122 A1 | 6/2004 | Reynolds, III et al. | |
| 2004/0157108 A1* | 8/2004 | Blunk et al. | 429/42 |
| 2005/0031933 A1 | 2/2005 | Blunk et al. | |
| 2009/0155570 A1* | 6/2009 | Bonnet et al. | 428/327 |

FOREIGN PATENT DOCUMENTS

| | | |
|---|---|---|
| JP | 2002-63914 | 2/2002 |
| JP | 2003-109618 | 4/2003 |
| KR | 10-2007-0049917 | 5/2007 |
| KR | 10-2007-0112367 | 11/2007 |

* cited by examiner

METAL SEPARATOR PLATE FOR A FUEL CELL HAVING A COATING LAYER COMPRISING CARBON PARTICLES DISPERSED IN A BINDER RESIN, AND A PRODUCTION METHOD THEREFOR

TECHNICAL FIELD

The present invention relates to a metallic bipolar plate for fuel cells and a method of manufacturing the same, and more particularly, to a metallic bipolar plate for fuel cells and a method of manufacturing the same, which can be applied to bipolar plates for a polymer electrolyte fuel cell (PEMFC) and satisfy the standards of corrosion resistance and contact resistance suggested by the Department of Energy (DOE) (wherein the corrosion current is set to 1 $\mu A/cm^2$ or less and the contact resistance is set to 20 $m\Omega \cdot cm^2$ or less) while allowing a continuous process to improve productivity.

BACKGROUND ART

A fuel cell is a generator that generally converts chemical energy into electrical energy through oxidation and reduction of hydrogen and oxygen.

Since a unit cell of the fuel cell generates too low a voltage to be used alone in practice, the fuel cell generally has several to several hundred unit cells stacked therein. When stacking the unit cells, separators or bipolar plates are used to facilitate electrical connection between the unit cells and to separate reaction gases in the stack of the unit cells while acting as a fluid passage through which a water coolant flows.

The separator or bipolar plate is an essential component for a fuel cell along with a membrane-electrode assembly (MEA) and has a variety of functions, such as structural support for MEA and gas diffusion layers (GDLs), collection and transmission of current, transmission and removal of reaction gas, transmission of the water coolant used for removing reaction heat, and the like.

Hence, it is necessary for a material for the bipolar plate to have good electrical and thermal conductivity, air-tightness, and corrosion resistance.

When a bipolar plate is made of a metallic material, there are many advantages in that volume and weight reduction of a fuel cell stack can be accomplished via thickness reduction of the bipolar plate, and in that the bipolar plate can be fabricated by stamping and the like, which facilitates mass production of the bipolar plates.

Stainless steel, aluminum alloys, carbon steel plates, and the like are proposed as candidate materials for the bipolar plate for fuel cells.

However, the use of the metallic material for the bipolar plate leads to formation of a passive film on the surface of the bipolar plate, which influences electrical conductivity. Further, considering high temperature and high humidity operating environments of the fuel cell, the electrical conductivity is likely to exhibit a gradual decrease due to a thickness increase of an oxide film on the bipolar plate and the bipolar plate can suffer functional deterioration resulting from corrosion when the fuel cell is used for a long period of time.

To solve such problems, attempts have been made to enhance corrosion resistance and electrical conductivity by increasing the contents of chromium and nickel in the stainless steel for the bipolar plate while removing the oxide film from the surface of the bipolar plate by etching the passive film.

However, the increase in contents of chromium and nickel in the stainless steel causes not only an increase in manufacturing costs of the stainless steel, but also the growth of the oxide film in the operating environment of the fuel cell, thereby having a negative influence upon long term performance. Furthermore, an excessive increase in contents of chromium and nickel deteriorates formability of the metallic bipolar plate, thereby making it difficult to obtain a complex and accurate fluid passage.

Another attempt to enhance electrical conductivity and corrosion resistance of the metallic bipolar plate for fuel cells is disclosed in U.S. Pat. No. 6,440,598 B1. In this disclosure, enhancement in the electrical conductivity of the bipolar plate is attempted by forming a carbon coating layer on a metal plate to prevent surface oxidation of the metal plate while providing good electrical conductivity to the bipolar plate through the metal plate having good electrical conductivity.

In U.S. Pat. No. 6,440,598 B1, however, when used in an environment of severe vibration as in vehicles, the fuel cell suffers powdering of carbon particles which constitute the carbon coating layer, that is, a phenomenon wherein the carbon particles are separated from the coating layer, whereby the separated carbon particles can contaminate the interior of the fuel cell, thereby causing deterioration in overall operation efficiency of the fuel cell.

A further attempt to enhance electrical conductivity and corrosion resistance of the metallic bipolar plate for fuel cells includes plasma coating or physical vapor deposition (PVD) for coating a material exhibiting good electrical conductivity and corrosion resistance onto the surface of the metal plate. However, this process requires a separate space, a so-called chamber, so that a continuous process cannot be used for fabricating the bipolar plate, thereby deteriorating productivity.

Therefore, there is a need for studies into various aspects to develop a method of manufacturing a metallic bipolar plate for fuel cells, which can satisfy the DOE standards in terms of corrosion resistance and contact resistance without any side effect not only initially but also after a predetermined period of time even in an environment of severe vibration as in vehicles while allowing a continuous process with a low manufacturing cost.

DISCLOSURE

Technical Problem

An object of the present invention is to provide a method of manufacturing a metallic bipolar plate for fuel cells, which can maintain good corrosion resistance and contact resistance without any side effect not only initially but also after a predetermined period of time even in an environment of severe vibration as in vehicles, while allowing a continuous process to provide high productivity.

Another object of the present invention is to provide a metallic bipolar plate for fuel cells manufactured by the method according to the invention.

Objects of the present invention are not limited to the aforementioned objects, and other non-described objects of the invention will become apparent to those skilled in the art from the following description.

Technical Solution

In accordance with an aspect of the invention, a method of manufacturing a metallic bipolar plate for fuel cells includes: (a) preparing a metal plate as a matrix of the metallic bipolar plate; (b) pickling a surface of the metal plate; (c) coating a composition comprising a binder resin, carbon particles, and a solvent on the pickled surface of the metal plate; and (d) drying the surface of the metal plate, on which the composition is coated, at a temperature less than a thermal decomposition temperature of the binder resin and greater than or equal to a boiling point of the solvent to form a coating layer on the surface of the metal plate, the coating layer having the carbon particles dispersed in a matrix of the binder resin, wherein these processes are performed as a continuous process.

In accordance with another aspect of the invention, a metallic bipolar plate for fuel cells includes: a metal plate; and a coating layer on a surface of the metal plate and having carbon particles dispersed throughout a volume of a matrix of a binder resin.

Advantageous Effects

The method of the invention can manufacture a metallic bipolar plate for fuel cells that satisfies the standards of corrosion resistance and contact resistance suggested by the DOE (wherein the corrosion current is set to 1 $\mu A/cm^2$ or less and the contact resistance is set to 20 $m\Omega \cdot cm^2$ or less) while allowing a continuous process to improve productivity.

DESCRIPTION OF PREFERRED EMBODIMENTS

Examples of the invention will be described in detail with reference to the accompanying drawings.

A description of details apparent to those skilled in the art will be omitted herein.

Figure 1:
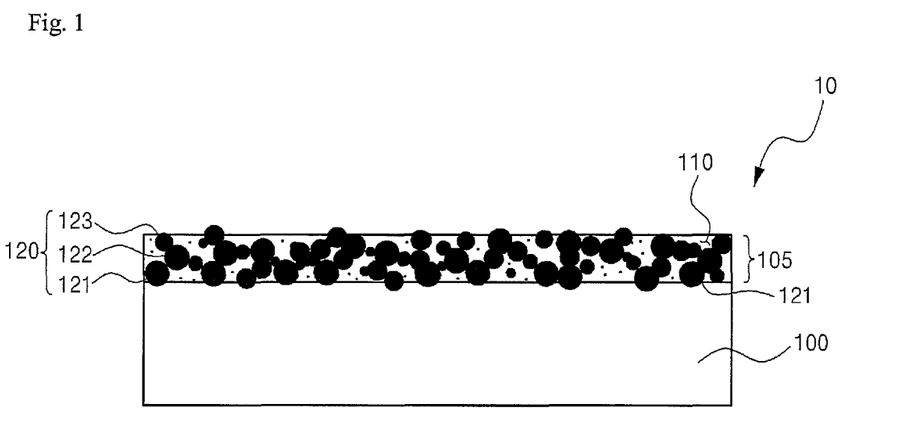
FIG. 1 is a sectional view of a metallic bipolar plate for fuel cells in accordance with an embodiment of the present invention.

FIG. 1 is a sectional view of a metallic bipolar plate for fuel cells in accordance with an embodiment of the invention.

Referring to FIG. 1, a bipolar plate 10 for fuel cells according to the embodiment includes a metal plate matrix 100 and a coating layer 105 on the metal plate matrix 100.

The metal plate matrix 100 may be selected from a stainless steel plate, an aluminum plate, and a carbon steel plate. In one embodiment, the stainless steel plate is preferably used.

When the stainless steel plate is used as the metal plate matrix 100, the stainless steel plate may comprise 0.08 wt % or less carbon (C), 16~28 wt % chromium (Cr), 0.1~20 wt % nickel (Ni), 0.1~6 wt % molybdenum (Mo), 0.1~5 wt % tungsten (W), 0.1~2 wt % tin (Sn), 0.1~2 wt % copper (Cu), and the balance of iron (Fe) and unavoidable impurities.

The metal plate matrix 100 has a thickness of 1t or less, and preferably 0.2t or less.

The coating layer 105 comprises a matrix 110 formed of a binder resin, and a conductive filler formed of carbon particles 120. The coating layer 105 serves to prevent corrosion of the surface of the metal plate matrix 100 and to transfer electric energy generated from a fuel cell.

The matrix 110 is formed of a polymer resin and serves as a kind of binder to prevent the phenomenon wherein the carbon particles 120 are separated from the surface of the metal plate matrix 100 and scattered in the form of powder, that is, the powdering phenomenon.

The polymer resin for the matrix 110 may include one selected from acrylic resins, phenolic resins, urethane resins, melanin resins, fluorine reins, silicone resins, epoxy resins, and a combination thereof. The polymer resin may further include a material acting as a hardening agent to facilitate hardening of the matrix 110.

The carbon particles 120 exhibit very good electrical conductivity and are uniformly or non-uniformly dispersed throughout the internal volume of the matrix 110 which is formed of the polymer binder resin.

Specifically, the carbon particles 120 are dispersed from the metal plate matrix 100 to the surface of the coating layer 105 to be electrically connected with each other in the matrix 110.

More specifically, parts of the carbon particles 120 (indicated by Reference Numeral 121 in FIG. 1) contact the surface of the metal plate matrix 100, other parts of the carbon particles 120 (indicated by Reference Numeral 123 in FIG. 1) are exposed to or protrude from the surface of the coating layer 105, and third parts of the carbon particles 120 (indicated by Reference Numeral 122 in FIG. 1) are dispersed in the matrix 110 while connecting the carbon particles 121 contacting the surface of the metal plate matrix 100 to the carbon particles 123 exposed on the surface of the coating layer 105.

The carbon particles 120 may include at least one selected from carbon black, graphite, and carbon nano-tube.

When the carbon black is used as the carbon particles 120, the carbon particles may have a particle size of 1 μm or less, and when the graphite is used as the carbon particles 120, the carbon particles may have a particles size of 3 μl or less.

Here, for a more dense and close connection between the carbon particles 120, it is preferred to use a combination of carbon particles having various particle sizes in the range suggested above. To this end, a mixture of carbon black, graphite, and carbon nano-tube mixed to have a proper size distribution may be used.

In the coating layer 105, the ratio of the carbon particles 120 to the polymer binder resin making up the matrix 110 is, in terms of weight, 1:1~6:1, and preferably 2:1~4:1. If the ratio is less than 1:1, it is difficult to secure electrical conductivity of the coating layer 105 due to an excessively high content of the polymer resin. If the ratio exceeds 6:1, corrosion resistance is deteriorated and the binder is added in too small an amount, thereby causing the powdering phenomenon.

A filling rate of the carbon particles in the coating layer 105 directly influences the overall contact resistance of the bipolar plate 10, the reason behind this will be described in detail below.

Figure 2:
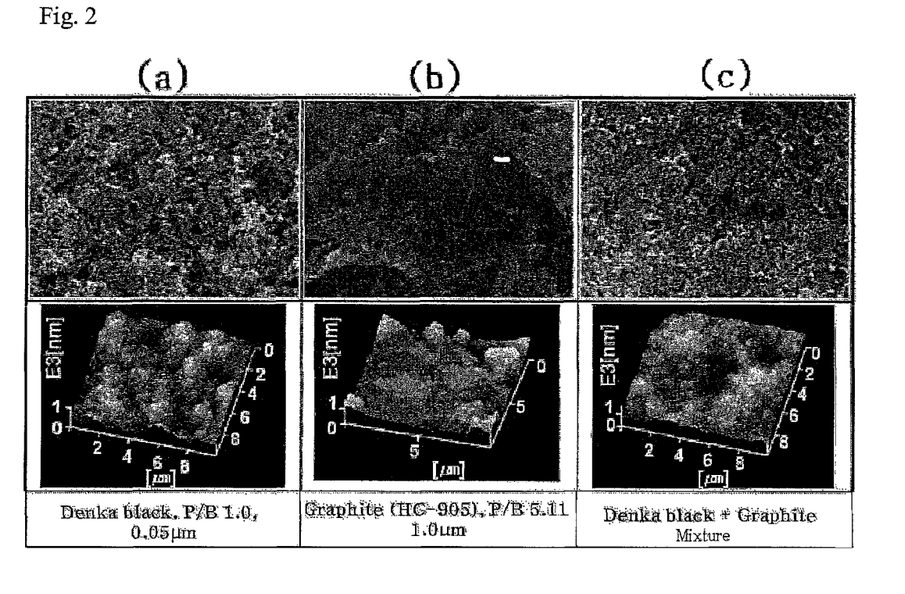
FIG. 2 is AFM (atomic force morphology SPA400, SEIKO Co. Ltd.) micrographs of coating layers formed of carbon black and graphite used alone or in a combination thereof inside a polymer binder resin.

In FIGS. 2, (a) to (c) are AFM (atomic force morphology SPA400, SEIKO Co. Ltd.) micrographs of coating layers formed of carbon black and graphite used alone or in a combination thereof inside a polymer resin (epoxy resin).

First, in FIG. 2, (a) shows a coating layer formed solely of carbon black having a particle size of about 0.05 μm, and it was seen from AFM measurement that the surface of the coating layer had a maximum roughness Rmax of about 0.5 μm and an average roughness (Ra) of 0.2 μm.

In FIG. 2, (b) shows a coating layer formed solely of graphite having a particle size of 1.0 μm, and it was seen from AFM measurement that the surface of the coating layer had a maximum roughness Rmax of about 3.0 μm and an average roughness (Ra) of about 1.1 μm.

In FIG. 2, (c) shows a coating layer formed of a mixture of carbon black having a particle size of 0.05 μm and graphite having a particle size of 1.0 μm mixed in a ratio of 1:2.5, and it was seen from AFM measurement that the surface of the coating layer had a maximum roughness Rmax of about 0.26 μm and an average roughness (Ra) of about 0.14 μm.

A gas diffusion layer was formed on a surface of each of the samples prepared as above and overall contact resistance was measured. The sample of FIG. 2(a) has a contact resistance of 19.1 mΩ·cm$^2$, the sample of FIG. 2(b) has a contact resistance of 25.6 mΩ·cm$^2$, and the sample of FIG. 2(c) has a contact resistance of 17.3 mΩ·cm$^2$.

Considering the results of (a) to (c) of FIG. 2 as described above, it could be seen that the surface roughness is less in the case of using the mixture of the carbon black and the graphite than in the case of using only one of the carbon black and the graphite. For the sample in FIG. 2(a) which is formed solely of the fine carbon black particles, complete dispersion of the fine carbon black particles is difficult and the fine carbon black particles are present in an aggregated state, providing a relatively high surface roughness. For the sample in FIG. 2(b) which is formed solely of the graphite particles, the surface roughness is relatively high due to coarseness and local aggregation of the graphite particles.

As compared with these samples, for the sample in FIG. 2(c) which is formed of the mixture of carbon black and graphite, the surface roughness is much less than that of the sample shown in FIG. 2(a) or (b). That is, the interior of the coating layer is filled with the carbon particles in such a way that the fine carbon black particles reside in spaces between the coarse graphite particles, so that the filling rate of the carbon particles in the coating layer can be increased. Further, since the coarse particles are mixed with the fine particles to thereby prevent local aggregation, the conductivity in the coating layer is improved.

Further, for the bipolar plate formed with the coating layer according to the invention, it is ascertained that the overall contact resistance of the bipolar plate is significantly lowered, since interface contact resistance with the gas diffusion layer (GDL) can be lowered by lowering the surface roughness of the coating layer.

Conclusively, the filling rate of the carbon particles in the coating layer 105 may be increased and the surface roughness of the coating layer may be decreased to lower the overall contact resistance of the bipolar plate for fuel cells when using the mixture of carbon black and graphite in a proper ratio in formation of the coating layer 105 than when using only one of the carbon black and the graphite.

For this purpose, the present invention suggests that the most optimal filling rate, surface roughness, and contact resistance be obtained when using both carbon black particles having an average particle size of 0.03~0.1 μm and graphite particles having an average particle size of 0.5~1.0 μm, which are mixed in a ratio of 1:1~1:3.

Referring again to FIG. 1, the coating layer 105 has a thickness of 0.1~10 μm, and preferably 1.5~3.5 μm. If the coating layer 105 has a thickness less than 0.1 μm, corrosion resistance is lowered, and if the coating layer 105 has a thickness exceeding 10 μm, the coating layer 105 suffers deterioration in coupling force to the metal plate matrix 100, so that deterioration in electrical conductivity and the powdering phenomenon can be caused.

Next, a method of manufacturing such a metallic bipolar plate for fuel cells according to one embodiment will be described with reference to other drawings.

Figure 3:
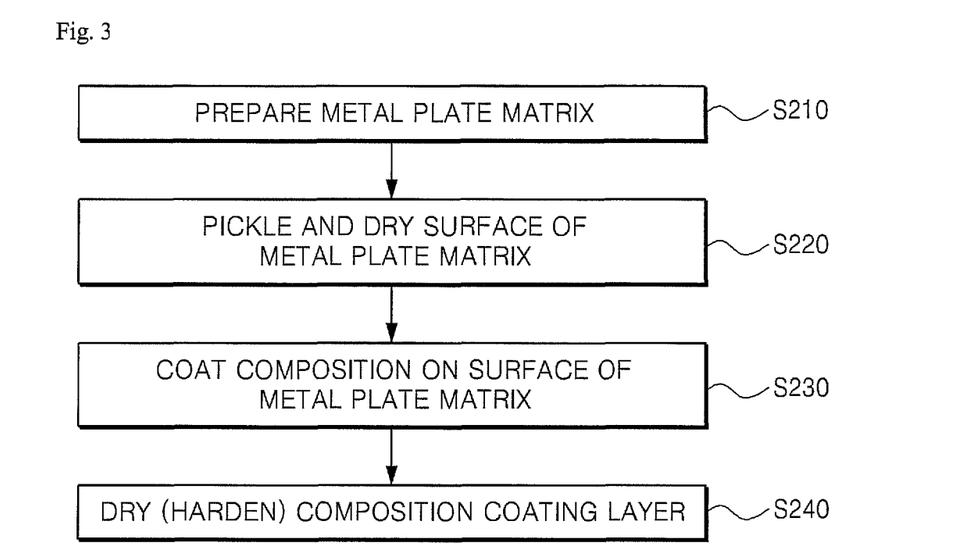
FIG. 3 is a flowchart illustrating a method for manufacturing a metallic bipolar plate according to an embodiment of the present invention.

FIG. 3 is a flowchart illustrating a method for manufacturing a metallic bipolar plate according to an embodiment, and FIGS. 4 to 7 are sectional views illustrating the respective processes of the method according to the embodiment.

Figure 4:
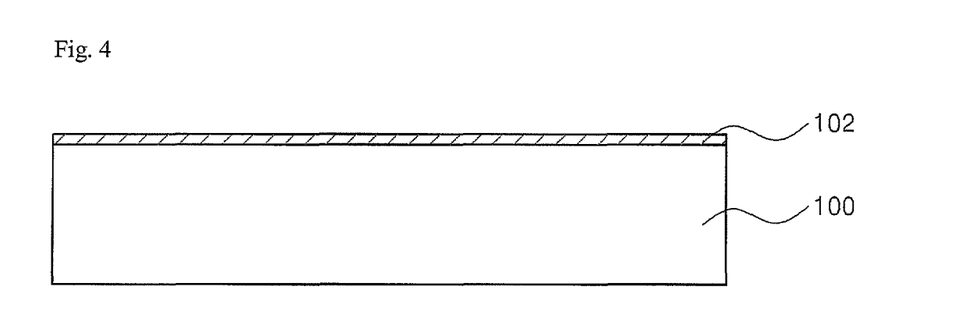
FIGS. 4 to 7 are sectional views illustrating the respective processes of the method according to the embodiment.

In order to manufacture the metallic bipolar plate according to the embodiment, a stainless steel plate 100 is first prepared in S210, as shown in FIG. 4.

The metal plate matrix 100 may be selected from a stainless steel plate, an aluminum plate, and a carbon steel plate. Preferably, the stainless steel plate is used.

When the stainless steel plate is used as the metal plate matrix 100, the stainless steel plate may comprise 0.08 wt % or less carbon (C), 16~28 wt % chromium (Cr), 0.1~20 wt % nickel (Ni), 0.1~6 wt % molybdenum (Mo), 0.1~5 wt % tungsten (W), 0.1~2 wt % tin (Sn), 0.1~2 wt % copper (Cu), and the balance of iron (Fe) and unavoidable impurities. More specifically, the stainless steel plate is an austenite stainless steel, such as SUS 316L 0.2 t The metal plate matrix 100 has a thickness of 1 t or less, and preferably 0.2t or less.

The metal plate matrix 100 has a passive film 102, which is a thin oxide film formed on the surface of the metal plate matrix 100 through oxidation during maintenance of the metal plate matrix in air.

The metal plate matrix 100 may be subjected to a degreasing process using an alkali or acid degreasing agent to remove foreign matter from the surface of the metal plate matrix 100 in order to improve adhesion of a composition, which will be coated in a subsequent process.

After the degreasing process, the metal plate matrix 100 is dried until moisture is sufficiently removed from the surface of the metal plate matrix 100.

By applying such a degreasing process to the metal plate matrix 100, foreign matter is removed from the surface of the metal plate matrix 100, thereby improving coating processibility and coating adhesion to metal plate matrix.

Figure 5:
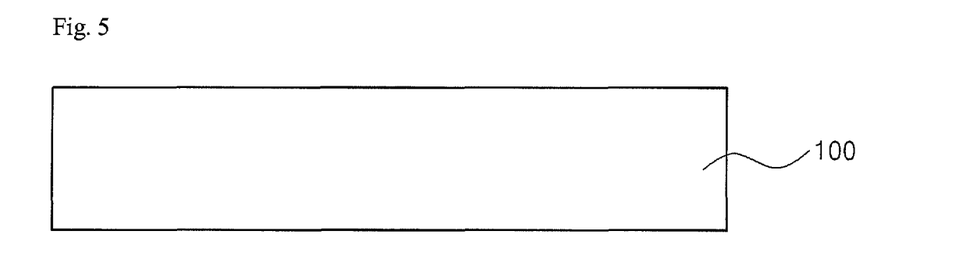

Next, the surface of the metal plate matrix 100 is subjected to pickling in S220, as shown in FIG. 5.

The picking process is performed using a picking solution, which comprises 5~25 wt % $HNO_3$, 2.5~20 wt % $H_2SO_4$ and the balance of $H_2O$, and preferably 10 wt % $HNO_3$, 5 wt % $H_2SO_4$ and the balance of $H_2O$.

Pickling may be performed at a temperature of 40~80 t for 40~80 seconds by a dipping type process, a spraying type process, or the like.

After pickling, the surface of the metal plate matrix 100 is subjected to water cleaning to remove an acid component therefrom, followed by drying to remove all liquid from the surface of the metal plate matrix 100.

As such, the oxide film 102 is removed from the surface of the steel plate by pickling. Specifically, when the stainless steel plate is used as the metal plate matrix 100, iron oxide is removed from the stainless steel plate, increasing relative chromium content, so that the surface of the stainless steel plate becomes rich in Cr.

The Cr-rich layer increases corrosion resistance while providing roughness to the surface of the matrix, thereby enhancing wettability in a coating process.

In this embodiment, all of degreasing, pickling, water cleaning and drying are performed for pretreatment, but some of these processes may be omitted as needed.

Figure 6:
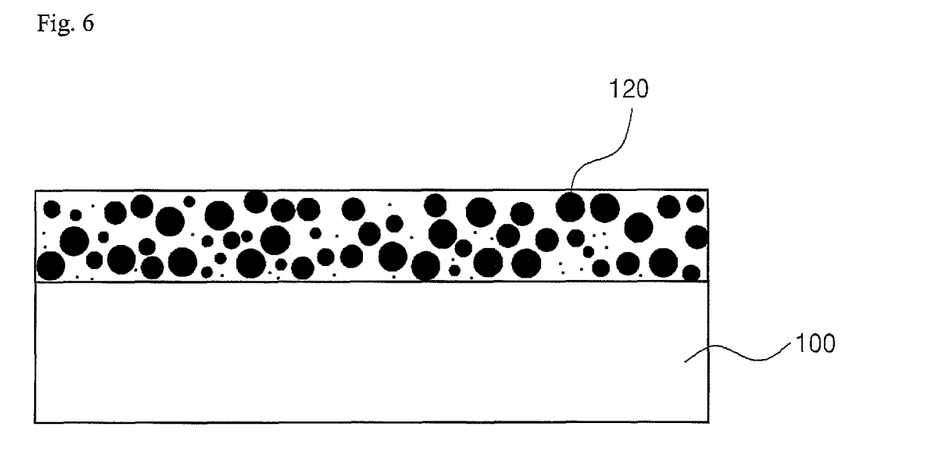

Next, as shown in FIG. 6, a composition is coated on the surface of the metal plate matrix 100, which is subjected to the pretreatment, in S230.

The composition contains carbon particles, a polymer resin acting as a binder, and a solvent.

The polymer resin used as the binder may include one selected from acrylic resins, phenolic resins, urethane resins, melanin resins, fluorine reins, silicone resins, epoxy resins, and a combination thereof. The polymer resin may further include a material acting as a hardening agent to facilitate hardening of the composition.

Here, to obtain a more uniform coating layer, the polymer binder resin may be prepared by mixing two kinds of resins among the resins described above. As a result, the binder resin permits a wide range of drying temperatures in a subsequent drying process, so that internal stress resulting from rapid drying of the polymer resin at a certain temperature is minimized.

In the composition, the content of binder resin may be in the range of 5~10 wt %. If the content of binder resin is less than 5 wt %, the content of carbon particles increases to cause the powdering phenomenon, which makes it difficult for the binder resin to function. If the content of binder resin exceeds 10 wt %, the content of carbon particles is relatively lowered, so that a desired level of electrical conductivity cannot be obtained.

The carbon particles may include at least one selected from carbon black, graphite, and carbon nano-tube.

When the carbon black is used as the carbon particles 120, the carbon particles may have a maximum particle size of 1 $\mu$m or less and an average particle size of 0.05~0.1 $\mu$m, and when the graphite is used as the carbon particles 120, the carbon particles may have a particles size of 3 $\mu$m or less and an average particle size of 0.5~1.0 $\mu$m.

Further, it is preferred in terms of particle filling rate in the coating layer, surface roughness, and surface resistance to use a combination of fine carbon particles and coarse graphite particles rather than to use only one kind of the carbon particles suggested above, as described above.

The mixing ratio and particle size of the carbon particles are described above with reference to FIG. 1.

In the composition, the content of carbon particles may be in the range of 10~60 wt %. If the content of carbon particles is less than 10 wt %, the content of binder resin is relatively increased, so that a desired level of electrical conductivity cannot be obtained, whereas if the content of binder resin exceeds 60 wt %, the content of binder resin is relatively decreased to cause the powdering phenomenon.

As described above, considering the electrical conductivity of the final coating layer and the powdering phenomenon, the ratio of the carbon particles to the polymer binder resin in the composition is, in terms of weight, 1:1~6:1, and preferably 2:1~4:1.

Further, the composition may contain 5~55 wt % of the carbon particles and polymer binder resin. If the content of the carbon particles and polymer binder resin is less than 5 wt % in the composition, the coating layer is not satisfactorily formed, whereas if the content of the carbon particles and polymer binder resin exceeds 55 wt %, the composition undergoes an excessive increase in viscosity, thereby making it difficult to obtain a uniform coating layer.

The solvent is used as a coating solution of the composition, and may include an organic solvent, such as hexanes, ketones, and alcohols, which may be used alone or in a combination thereof. Alternatively, water ($H_2O$) may be used as the solvent. In this regard, it should be understood that these solvents are provided for illustration only and other kinds of solvent can also be used.

The solvent will be completely removed later by drying (hardening). Here, if a large amount of solvent is removed at a constant temperature, pores are likely to be formed in the hardened coating layer or the hardened coating layer can become non-dense. Such problems can be solved using a mixture of solvents having different boiling points to induce gradual removal of the solvents over the temperature distribution.

Coating the composition may be performed by spray coating, dip coating, roll coating, or the like. Here, the coating type is selected depending on when stamping is performed to form a gas passage and a water coolant passage on the metallic bipolar plate for fuel cells.

In other words, when the stamping of the metal plate matrix 100 is performed before coating the composition, the coating process may be performed by spray coating or dip coating which is suitable for an irregular surface. When the stamping is performed after coating the composition, the coating process may be performed by roll coating.

It should be understood that the spray coating or dip coating may also be adopted even in the case where the stamping is performed after coating the composition.

The properties of the composition coating layer are described in more detail with reference to FIG. 6. When the composition coating layer contains the solvent, the carbon particles 120 are not completely connected to each other and are less densely dispersed in the coating layer by the polymer resin and the solvent.

Figure 7:
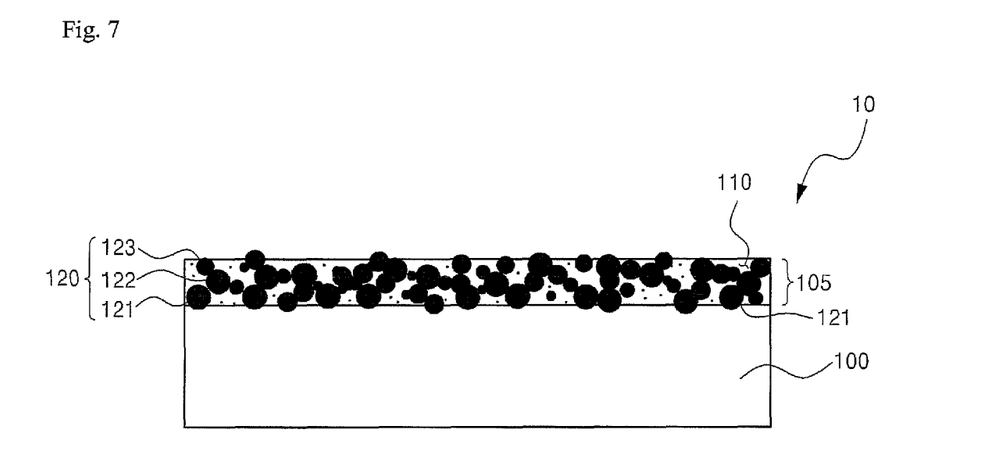

Finally, the metal plate matrix 100 having the composition coated thereon is dried to cure the composition coating layer in S240, as shown in FIG. 7.

By this process, most of the solvent in the coating layer is removed (a portion of the polymer binder resin may also be evaporated), and only the polymer binder resin 110 and the carbon particles 120 remain in the coating layer.

The drying temperature is determined depending on the kind of solvent and polymer binder resin used for the composition. That is, the drying temperature is determined in a temperature range lower than the thermal decomposition temperature of the polymer binder resin and the boiling point of the solvent, preferably, in the range of 160~340° C.

Drying is performed for a suitable duration to volatize all or at least 99% of the solvent while completely solidifying the binder resin. Preferably, drying may be performed for 13 seconds ~30 minutes.

Although a higher drying temperature can lead to a shorter drying period, rapid drying at high temperatures results in solidification of the binder resin in the coating layer before sufficient removal of the solvent to cause formation of pores and improper distribution of the carbon particles in the coating layer, whereby the bipolar plate cannot exhibit optimal conductivity and corrosion resistance.

Drying may be performed in air, and drying pressure may be lowered to facilitate solvent removal. Alternatively, drying may be performed in a hydrogen reduction atmosphere to prevent undesired oxidation during the drying.

Through the drying process, the composition coating layer is hardened and a conductive coating layer 105 having certain hardness is formed on the metal plate matrix 100.

During the drying process, most of the solvent is volatized and the composition coating layer of FIG. 6 shrinks, so that the carbon particles are subjected to compression and connected to each other in the coating layer. That is, the carbon particles subjected to compression are connected to each other in the hardened coating layer 105, as described with reference to FIG. 1. Since the properties and shape of the hardened coating layer 105 are the same as those of the coating layer described above with reference to FIG. 1, detailed descriptions thereof will be omitted herein.

On the other hand, after forming the composition coating layer of FIG. 7 and before performing the drying process of FIG. 7, pre-heating of the composition coating layer may be performed to remove some of the solvent from the composition coating layer before the main drying process of FIG. 7.

Since the drying process of FIG. 7 is performed at the boiling point or more of the solvent, the solvent is rapidly removed from the composition coating layer, so that internal stress can be generated in the coating layer, thereby deteriorating adhesion or coupling force of the coating layer to the metal plate matrix 100.

Preheating may be performed at a temperature less than or equal to the boiling point of the solvent used for the composition. Specifically, the pre-heating may be performed at 50~150° for 5~30 minutes.

Since the processes S210~S220 are performed as a continuous process, it is possible to provide very high productivity.

Next, a description of the invention will be given with reference to examples and comparative examples to show that metallic bipolar plates for fuel cells manufactured by the method according to the invention exhibit excellent corrosion resistance and contact resistance.

A description of details apparent to those skilled in the art will be omitted herein.

1. Examples and Comparative Examples

Examples 1~16

A metal plate matrix was stainless steel plate 316L having a thickness of 1.0 mm or less. As carbon particles, carbon black (Printex L, denka black, ketjen black, acetylene black, vulcan XC72) and graphite (CPB30, HN905) were used.

As a polymer binder resin, an epoxy resin, a phenol resin, and a urethane resin were used, and as a solvent, a mixture of ketone, alcohol and acetate was used. A basket mill was used as a dispersion device.

Examples 1 to 16 were prepared under conditions as suggested by the invention, in terms of mixing ratio of carbon particles and binder resin, content (NV content) of carbon particles and binder resin except for the solvent in a composition for a coating layer, drying temperature, and drying period. Detailed conditions for the examples, such as the kinds of carbon particles, binder resin and solvent, and drying temperature, are listed in Tables 1 and 2.

Comparative Examples 1~6

Comparative Examples 1 to 6 were prepared under conditions, which do not satisfy the present invention, in terms of mixing ratio of carbon particles and binder resin, content (NV content) of carbon particles and binder resin except for the solvent in a composition for a coating layer, drying temperature, and drying period. Detailed conditions for the comparative examples are listed in Table 2.

2. Measurement of Contact Resistance

Figure 8:
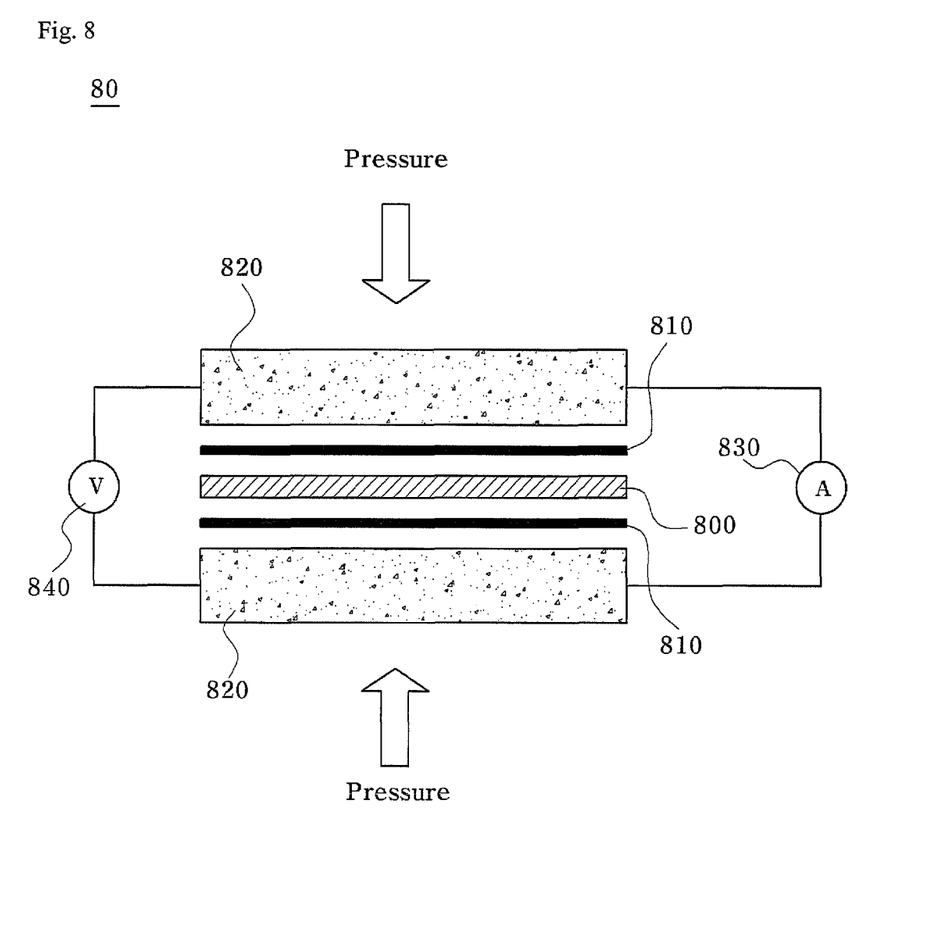
FIG. 8 is a sectional view of a contact resistance tester for measuring contact resistance of a stainless steel bipolar plate for fuel cells according to the present invention.

FIG. 8 is a sectional view of a contact resistance tester for measuring contact resistance of a stainless steel bipolar plate according to one embodiment.

Referring to FIG. 8, to obtain optimized parameters for cell assembly through measurement of contact resistance of stainless steel bipolar plates for fuel cells prepared by the examples and the comparative examples, a modified Davies method was used to measure contact resistance between stainless steel (SS) and two pieces of carbon paper.

The contact resistance was measured based on the principle of measuring four-wire current-voltage using a contact resistance tester IM6 of Zahner Inc. Here, the electrode formed by the four-wire current-voltage method had an area of 25 cm$^2$.

Measurement of the contact resistance was performed by application of DC 5 A and AC 0.5 A in a constant-current mode at a frequency of 10 kHz to 10 MHz.

The carbon paper was 10 BB of SGL Inc.

In a contact resistance tester 80, a sample 800 was disposed between two pieces of carbon paper 810 and gold-plated copper plates 820 connected to both a current supplier 830 and a voltage tester 840.

Voltage was measured by applying DC 5A/AC 0.5 A to the sample 800 using a current supplier 830 (IM6 of Zahner Inc.).

Then, the sample 800, carbon paper 810, and copper plates 820 were compressed to form a stacked structure from both copper plates 820 of the contact resistance tester 80 using a pressure regulator (Model No. 5566, Instron Inc., compression maintaining test). Using the pressure regulator, a pressure of 50~150 N/cm$^2$ was applied to the contact resistance tester 80.

Finally, the contact resistances of samples 800, that is, stainless steel bipolar plates for fuel cells, of the examples and the comparative examples shown in Table 1 were measured using the contact resistance tester 80 installed as described above.

3. Measurement of Corrosion Current

A corrosion current of the stainless steel plate according to the present invention was measured using EG&G Model No. 273A as a corrosion current tester. Tests for corrosion durability were performed in a simulated environment of a polymer electrolyte fuel cell (PEFC).

After being etched at 80° C. with 0.1N $H_2SO_{4+5}$ ppm HF as an etching solution, the stainless steel plate samples were subjected to $N_2$ bubbling for 1 hour, and the corrosion current thereof was measured at an open circuit potential (OCP) of −0.25V~1.2V vs. SCE.

Other physical properties were measured at −0.24V vs. SCE (saturated calomel reference electrode) for a PEFC anode environment and at 0.6V vs. SCE (0.842 vs. NHE) for a PEFC cathode environment.

Here, the measured properties were evaluated based on data of corrosion current at 0.6V vs. SCE (0.842 vs. NHE), the environment of which is similar to a cathode environment in a fuel cell.

The anode environment is an environment in which hydrogen is split into hydrogen ions and electrons while passing through a membrane electrode assembly (MEA), and the cathode environment is an environment in which oxygen combines with the hydrogen ions to produce water after passing through the MEA.

Since the cathode environment has a high potential and is a very corrosive environment, it is desirable to test corrosion resistance in the cathode environment.

Further, the stainless steel plate preferably has a corrosion current density of 1 μA/cm$^2$ or less at ~0.6V vs. SCE (0.842 vs. NHE) in accordance with the DOE standards.

4. Analysis of Measurement Results of Corrosion Current and Contact Resistance The measurement results of corrosion current and contact resistance of the examples and the comparative examples are listed in Tables 1 and 2.

The stainless steel plate preferably has a corrosion current of 1 µA/cm² or less and a contact resistance of 20 mΩ·cm² or less in accordance with the DOE standards.

5. Evaluation of Performance of Fuel Cell

Bipolar plates, each having a serpentine passage for supplying reaction gas, were used. Each fuel cell was prepared by interposing a membrane electrode assembly (Model 5710 from Gore Fuel Cell Technologies, Inc.) and a gas diffusion layer (Model 10BA from SGL Co., Ltd.) between the bipolar plates and compressing the same with a predetermined pressure.

Performance of each of the fuel cells was evaluated using a unit cella NSC Test Station 700W class was used as a fuel cell operator, and KIKUSUI PLZ 664 Electronic Loader was used as an electronic loader for evaluating the performance of the fuel cell.

As the reaction gas, hydrogen and air were supplied at a given flux with a stoichiometric ratio of $H_2$ to air of 1.5:2.0 according to the electric current after being humidified to a relative humidity of 100%. The performance of the fuel cell was evaluated at atmospheric pressure while maintaining the temperature of a humidifier and the cell at 70° C. An active area was 25cm² and an operating pressure was 1 atm.

Referring to Tables 1 and 2, it can be understood that the bipolar plates for fuel cells prepared by the examples had a corrosion current of 1 µA/cm² or less and a contact resistance of 20 mΩ·cm² or less, all of which satisfy the standards set by the DOE.

Conversely, it can be seen that Comparative Examples 1 and 5 suffered from the powdering phenomenon. It is assumed that the powdering phenomenon was caused by the excessively high content of carbon particles in Comparative Example 1 and by the excessively high drying temperature to remove a large amount of polymer binder in Comparative Example 5.

Further, Comparative Examples 2, 3, 4 and 6 have contact resistances, which do not satisfy the DOE standards and are higher than those of the examples according to the invention. The reason behind this is that Comparative Example 2 had a low content of carbon particles, that Comparative Examples 3 and 4 suffered from incomplete formation of the binder resin in the coating layer, causing a non-dense connection between the carbon particles due to a low drying temperature and a short drying period, respectively, and that Comparative Example 6 had a passive film on the stainless steel plate, which was not coated.

Figure 9:
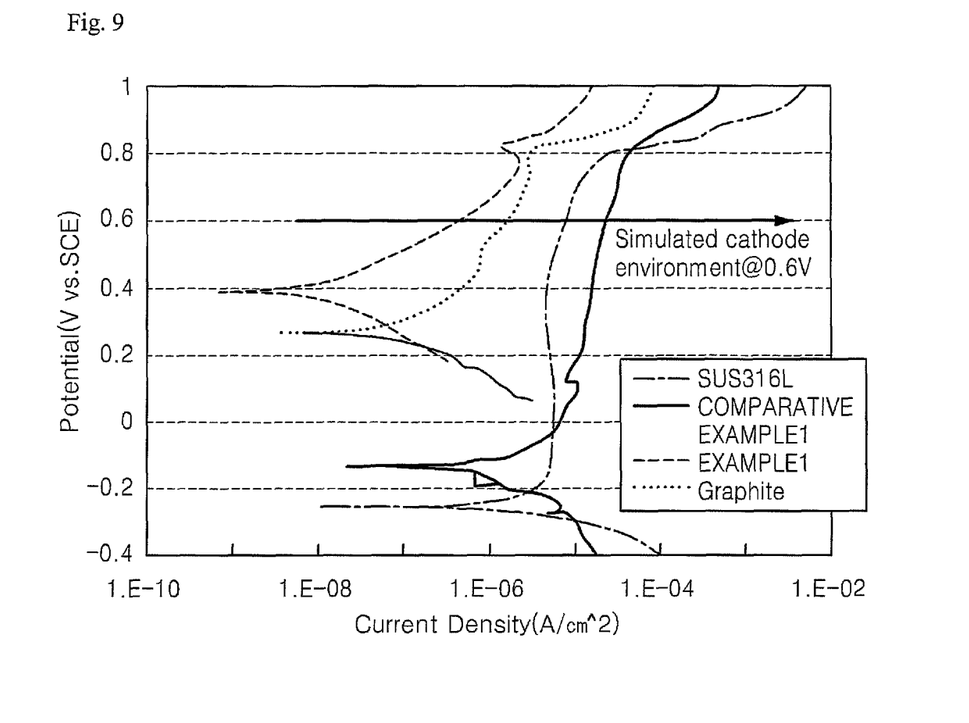
FIG. 9 is a graph depicting results of corrosion resistance measurement of a bipolar plate of stainless SUS 316L, a bipolar plate of graphite, and a bipolar plate of Example 1, a bipolar plate of Comparative Example 1.

FIG. 9 is a graph depicting results of corrosion resistance measurement of a bipolar plate of stainless SUS 316L, a bipolar plate of graphite, and a bipolar plate of Example 1, a bipolar plate of Comparative Example 1.

To measure corrosion resistance of the coating layer, polarization testing was performed at a corrosion current density

TABLE 1

| | Conditions of Solution | | | | | Drying | | Property | |
|---|---|---|---|---|---|---|---|---|---|
| | Binder | Pigment | Ratio (P:B) | Content (NV) | Other | Pre-treatment | Temp. (°C.) | Time | EC (mΩ cm²) | CR (µA/cm²) |
| Example 1 | E | CB | 3:1 | 18% | solvent | pickling | 250 | 60 sec. | 1.75 | 0.56 |
| Example 2 | P | CB | 3:1 | 18% | | | 250 | 60 sec. | 18.4 | 0.61 |
| Example 3 | U | CB | 3:1 | 18% | | | 250 | 60 sec. | 19.1 | 0.65 |
| Example 4 | E | CB + G | 3:1 | 25% | | | 250 | 60 sec. | 17.3 | 0.75 |
| Example 5 | E + P | CB + G | 3:1 | 25% | | | 250 | 60 sec. | 16.8 | 0.45 |
| Example 6 | E + P | CB + G | 5:1 | 36% | | | 250 | 60 sec. | 15.4 | 0.84 |
| Example 7 | E + P | CB + G | 6:1 | 45% | | | 250 | 60 sec. | 14.9 | 0.94 |
| Example 8 | E + P | CB + G | 1:1 | 12% | | | 250 | 60 sec. | 19.6 | 0.12 |
| Example 9 | E + P | CB + G | 3:1 | 25% | | | 250 | 40 sec. | 19.3 | 0.21 |
| Example 10 | E + P | CB + G | 3:1 | 25% | | | 250 | 5 min. | 16.3 | 0.79 |
| Example 11 | E + P | CB + G | 3:1 | 25% | | | 300 | 20 sec. | 18.1 | 0.75 |
| Example 12 | E + P | CB + G | 3:1 | 25% | | | 200 | 60 sec. | 18.9 | 0.58 |
| Example 13 | E + P | CB + G | 3:1 | 25% | | | 160 | 30 min. | 19.2 | 0.36 |

E: Epoxy resin, P: Phenol resin, U: urethane resin, CB: carbon black, G: graphite, EC: Electrical conductivity, CR: Corrosion resistance

TABLE 2

| | Conditions of Solution | | | | | Drying | | Property | | |
|---|---|---|---|---|---|---|---|---|---|---|
| | Binder | Pigment | Ratio (P:B) | Content (NV) | Other | Pre-treatment | Temp. (°C.) | Time | EC (mΩ cm²) | CR (µA/cm²) | Remark |
| Example 14 | E + P | CB + G | 2:1 | 17% | solvent | pickling | 250 | 60 sec. | 18.9 | 0.69 | |
| Example 15 | E + P | CB + G | 3:1 | 25% | | | 340 | 13 sec. | 15.6 | 0.75 | |
| Example 16 | E + P | CB + G | 3:1 | 25% | | | 300 | 60 sec. | 19.5 | 0.23 | |
| Com. Example 1 | E + P | CB + G | 7:1 | 65% | | | 250 | 60 sec. | 13.7 | 17.9 | * |
| Com. Example 2 | E + P | CB + G | 0.5:1 | 17% | | | 250 | 60 sec. | 29.0 | 0.11 | |
| Com. Example 3 | E + P | CB + G | 3:1 | 25% | | | 150 | 60 sec. | 31.3 | 0.19 | |
| Com. Example 4 | E + P | CB + G | 3:1 | 25% | | | 250 | 10 sec. | 32.8 | 0.15 | |
| Com. Example 5 | E + P | CB + G | 3:1 | 25% | | | 350 | 60 sec. | 14.2 | 2.9 | * |
| Com. Example 6 | Stainless 316L (material, no-treatment) | | | | | | | | 82.0 | 7.9 | |

E: Epoxy resin, P: Phenol resin, CB: carbon black, G: graphite, EC: Electrical conductivity, CR: Corrosion resistance,
* powdering phenomenon by applying a potential of 0.6V (vs. SCE), the environment of which is similar to a cathode environment of a fuel cell.

Referring to FIG. 9, it can be seen that the bipolar plate of Example 1 exhibits a lower corrosion current density than the bipolar plates formed of SUS 316L and graphite. Specifically, the bipolar plate of Example 1 has a corrosion current density of 0.5 µA/cm² or less, the bipolar plate of SUS 316L has a corrosion current density of about 8.1 µA/cm², and the bipolar plate of the graphite has a corrosion current density of about 21.7 µA/cm².

Figure 10:
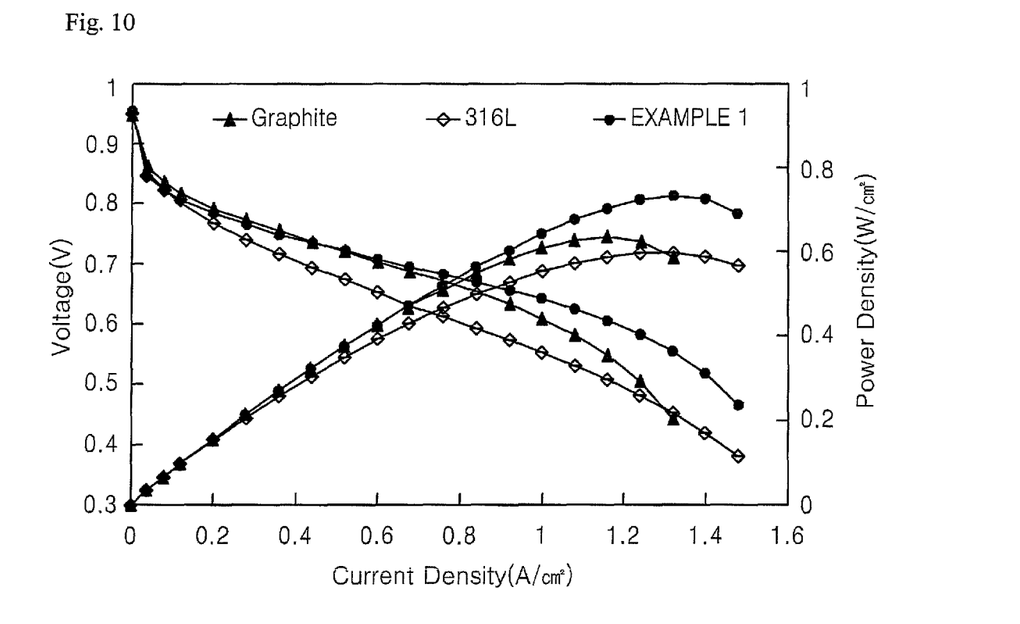
FIG. 10 is a graph depicting results of performance evaluation of fuel cells including a bipolar plate of stainless SUS 316L, a bipolar plate of graphite, and a bipolar plate of Example 1, respectively.

FIG. 10 is a graph depicting results of performance evaluation of fuel cells including a bipolar plate of SUS 316L, a bipolar plate of graphite, and a bipolar plate of Example 1, respectively.

For SUS 316L used as the matrix of the bipolar plate, the fuel cell exhibits low performance due to high contact resistance, and for the bipolar plate of Example 1, the fuel cell exhibits superior performance to the other fuel cells. Particularly, the fuel cell of Example 1 exhibits better performance than the fuel cell including the bipolar plate formed of graphite.

Therefore, the short-term fuel cell performance evaluation shows that the metallic bipolar plate including the coating layer according to the invention can replace graphite bipolar plates and has high applicability to fuel cells in practice.

The invention claimed is:

1. A method of manufacturing a metallic bipolar plate for fuel cells, comprising:
    (a) preparing a metal plate as a matrix of the metallic bipolar plate;
    (b) degreasing and pickling a surface of the metal plate for pretreatment;
    (c) coating a composition on the pickled surface of the metal plate, the composition comprising a binder resin, carbon particles and a solvent, and a mixing ratio of the carbon particles and the binder resin being 1:1~6:1 in terms of weight; and
    (d) drying the surface of the metal plate, on which the composition is coated, at a temperature less than a thermal decomposition temperature of the binder resin and greater than or equal to a boiling point of the solvent to form a coating layer on the surface of the metal plate, the coating layer having the carbon particles dispersed in a matrix of the binder resin.

2. The method according to claim 1, wherein the metal plate is selected from a stainless steel plate, an aluminum plate, and a carbon steel plate.

3. The method according to claim 1, wherein the composition used in step (c) comprises 10~60 wt % of the carbon particles, 5~10 wt % of the binder resin, and the balance of the solvent.

4. The method according to claim 1, wherein the binder resin is at least one selected from acrylic resins, phenolic resins, urethane resins, melanin resins, fluorine reins, silicone resins, and epoxy resins.

5. The method according to claim 1, wherein the carbon particles comprise one selected from carbon black, graphite, and carbon nano-tube (CNT).

6. The method according to claim 5, wherein the carbon black has a particle size of 1 µm or less and the graphite has a particle size of 3 µm or less.

7. The method according to claim 1, wherein the carbon particles comprise a mixture of the carbon black and the graphite in a ratio of 1:1~1:3 to increase a filling rate of the carbon particles in the coating layer, the carbon black having an average particle size of 0.03~0.1 µm and the graphite having an average particle size of 0.5~1.0 µm.

8. The method according to claim 1, wherein the binder resin and the carbon particles are contained in an amount of 55 wt % or less in the composition.

9. The method according to claim 1, wherein the solvent comprises an organic solvent selected from hexanes, ketones, alcohols and acetates to be used alone or in a combination thereof, or comprises water ($H_2O$).

10. The method according to claim 1, wherein the drying in step (d) is performed at a temperature of 160~340 °C.

11. The method according to claim 1, further comprising: pre-heating the metal plate having the composition coating layer on the surface thereof at a temperature less than the boiling point of the solvent between step (c) and step (d).

12. The method according to claim 11, wherein the pre-heating is performed at 50~150 °C. for 5~30 minutes.

13. The method according to claim 1, wherein the coating layer has a thickness of 0.1~10 µm.

14. The method according to claim 1, wherein the drying in step (d) is performed for 13 seconds ~ 30 minutes.

15. The method according to claim 1, wherein the manufactured bipolar plate for fuel cells has a corrosion current of 1 µA/cm² or less and a contact resistance of 20 mΩ·cm² or less.

16. A metallic bipolar plate for fuel cells, comprising: a metal plate having a pickled surface;
    and a coating layer formed on the pickled surface of the metal plate, wherein the coating layer has carbon particles dispersed throughout a volume of a matrix composed of a binder resin, wherein a mixing ratio of the carbon particles and the binder resin ranges from 1:1-6:1, and the bipolar plate having a corrosion current of 1 µA/cm² or less and a contact resistance of 20 mΩ·cm² or less.

17. The metallic bipolar plate according to claim 16, wherein the metal plate is selected from a stainless steel plate, an aluminum plate, and a carbon steel plate.

18. The metallic bipolar plate according to claim 16, wherein the binder resin is at least one selected from acrylic resins, phenolic resins, urethane resins, melanin resins, fluorine reins, silicone resins, and epoxy resins.

19. The metallic bipolar plate according to claim 16, wherein the carbon particles comprise one selected from carbon black, graphite, and carbon nano-tube (CNT).

20. The metallic bipolar plate according to claim 16, wherein the carbon black has a particle size of 1 µm or less and the graphite has a particle size of 3 µm or less.

21. The metallic bipolar plate according to claim 16, wherein the carbon particles comprise a mixture of the carbon black and the graphite in a ratio of 1:1~1:3, the carbon black having an average particle size of 0.03~0.1 µm and the graphite having an average particle size of 0.5~1.0 µm.

22. The metallic bipolar plate according to claim 16, wherein the coating layer has a thickness of 0.1~10 µm.

23. The method according to claim 3, wherein the binder resin is at least one selected from acrylic resins, phenolic resins, urethane resins, melanin resins, fluorine reins, silicone resins, and epoxy resins.

24. The method according to claim 3, wherein the carbon particles comprise one selected from carbon black, graphite, and carbon nano-tube (CNT).

25. The method according to claim 3, wherein the carbon particles comprise a mixture of the carbon black and the graphite in a ratio of 1:1~1:3 to increase a filling rate of the carbon particles in the coating layer, the carbon black having an average particle size of 0.03~0.1 µm and the graphite having an average particle size of 0.5~1.0 µm.

26. The method according to claim 3, wherein the binder resin and the carbon particles are contained in an amount of 55 wt % or less in the composition.

27. The method according to claim 3, wherein the solvent comprises an organic solvent selected from hexanes, ketones, alcohols and acetates to be used alone or in a combination thereof, or comprises water ($H_2O$).

* * * * *